(12) United States Patent
Smoyer et al.

(10) Patent No.: US 8,195,244 B2
(45) Date of Patent: Jun. 5, 2012

(54) MULTI-DIRECTIONAL DISPLAY COMMUNICATION DEVICES, SYSTEMS, AND METHODS

(75) Inventors: Clinton J. Smoyer, Raymore, MO (US); Steve Robertson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 382 days.

(21) Appl. No.: 12/392,586

(22) Filed: Feb. 25, 2009

(65) Prior Publication Data

US 2010/0216514 A1 Aug. 26, 2010

(51) Int. Cl.
*H04B 1/38* (2006.01)

(52) U.S. Cl. ................. 455/566; 455/566.1

(58) Field of Classification Search ........... 455/566, 455/566.1; 345/659, 204, 661, 536; 379/433.04; 361/681, 683
See application file for complete search history.

(56) References Cited

U.S. PATENT DOCUMENTS

| | | | |
|---|---|---|---|
| 6,169,789 B1 * | 1/2001 | Rao et al. ............ | 379/110.01 |
| 6,882,859 B1 * | 4/2005 | Rao et al. ............ | 455/550.1 |
| 7,062,291 B2 * | 6/2006 | Ryley et al. .......... | 455/556.1 |
| 7,912,508 B2 * | 3/2011 | Lee et al. ............ | 455/566 |
| 2003/0186729 A1 * | 10/2003 | Engstrom et al. .... | 455/575.8 |
| 2005/0140565 A1 * | 6/2005 | Krombach ............ | 345/1.1 |
| 2007/0097108 A1 * | 5/2007 | Brewer ................. | 345/204 |
| 2007/0188450 A1 * | 8/2007 | Hernandez et al. ... | 345/158 |
| 2009/0042619 A1 * | 2/2009 | Pierce et al. ......... | 455/566 |
| 2009/0163241 A1 * | 6/2009 | Vossoughi et al. ... | 455/556.1 |
| 2010/0045705 A1 * | 2/2010 | Vertegaal et al. .... | 345/661 |
| 2010/0085382 A1 * | 4/2010 | Lundqvist et al. .... | 345/659 |
| 2010/0231541 A1 * | 9/2010 | Cruz-Hernandez et al. | 345/173 |
| 2010/0298032 A1 * | 11/2010 | Lee et al. ............ | 455/566 |
| 2010/0298033 A1 * | 11/2010 | Lee .................... | 455/566 |
| 2011/0059775 A1 * | 3/2011 | Choi et al. ........... | 455/566 |
| 2011/0065479 A1 * | 3/2011 | Nader ................. | 455/566 |

OTHER PUBLICATIONS http://www.trendhunter.com/trends/p-per-mobile-cell-phone; p. 1.
http://petitinvention.wordpress.com/2008/10/08/just-a-sketch-mobile-phone/; pp. 1-6.
http://science.howstuffworks.com/invisibility-cloak.htm; How Invisibility Cloaks Work; William Harris; pp. 1-8.

* cited by examiner

*Primary Examiner* — Vibol Tan
(74) *Attorney, Agent, or Firm* — Swanson & Bratschun, L.L.C.

(57) ABSTRACT

The illustrative embodiments described herein are directed to a systems, methods, and communication devices for displaying an image in a plurality of directions. In one embodiment, the communication device includes a memory adapted to store an image and a plurality of display surfaces. Each of the plurality of display surfaces may face a different direction. Also, the plurality of display surfaces may each be operable to display a different portion of the image.

16 Claims, 6 Drawing Sheets

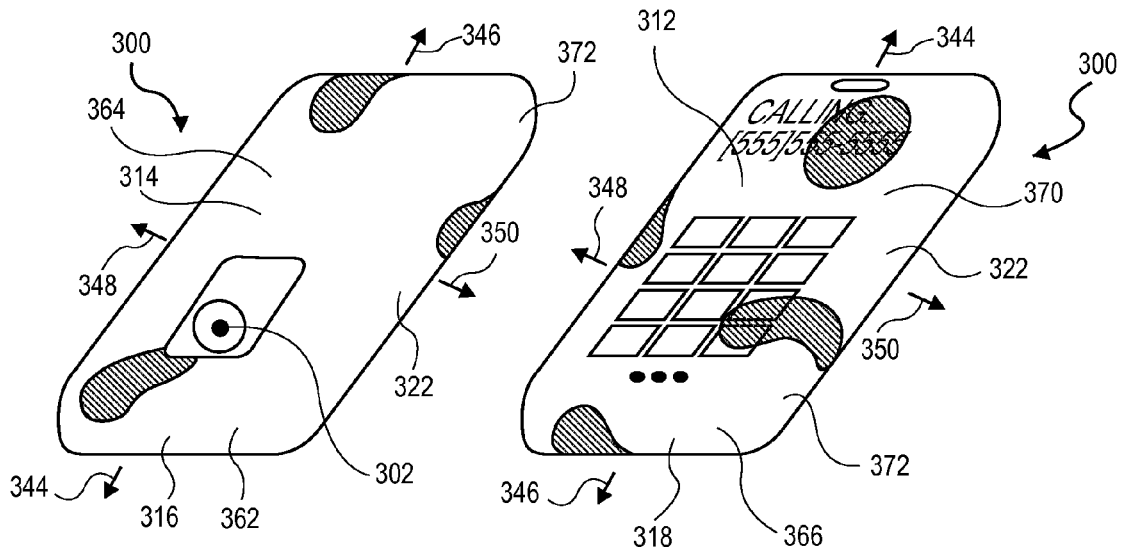
FIG. 4A  FIG. 4B
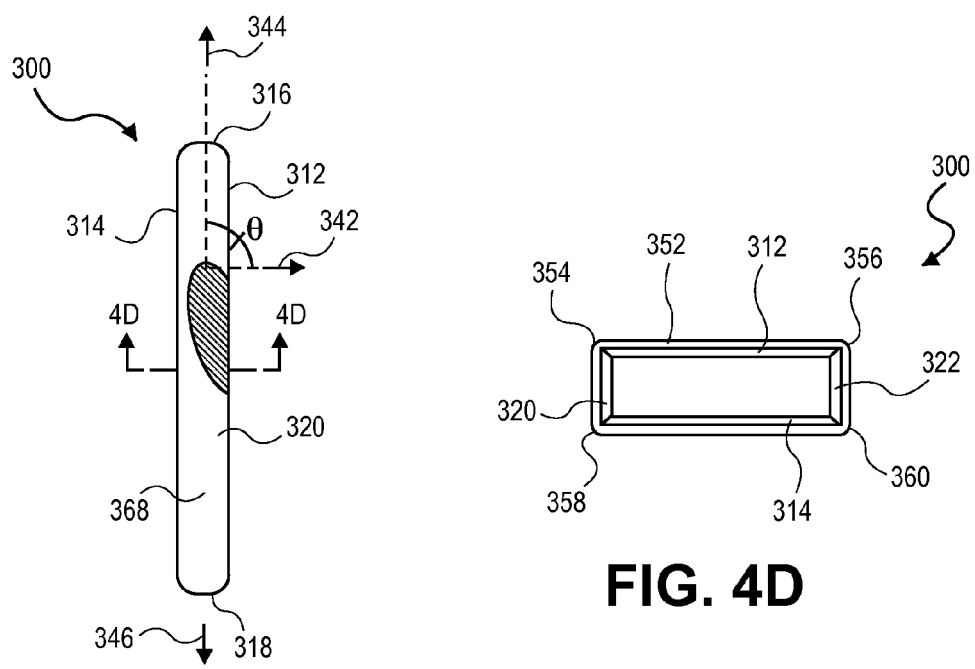
FIG. 4C  FIG. 4D

MULTI-DIRECTIONAL DISPLAY COMMUNICATION DEVICES, SYSTEMS, AND METHODS

BACKGROUND OF THE INVENTION

1. Field of the Invention

The illustrative embodiments relate generally to multi-directional display communication devices, systems, and methods.

2. Description of the Related Art

Communication devices are now commonly used in a wide variety of commercial, governmental, and personal applications. A communication device is any device capable of communicating with a user or another device. Non-limiting examples of communication devices include phones, including landline and cellular phones, walkie talkies, personal computers, personal digital assistants, music players, and laptop computers. The physical appearance of a communication device may serve a variety of purposes, including aesthetic or data display purposes. For example, covers, such as fabrics, hard shells, caps, films, cases, or stickers, may be applied to the communication device to customize or alter the aesthetic appearance of the communication device.

SUMMARY

According to an illustrative embodiment, a communication device for displaying an image in a plurality of directions includes a memory adapted to store an image and a plurality of display surfaces. Each of the plurality of display surfaces may face a different direction. Also, the plurality of display surfaces may each be operable to display a different portion of the image.

BRIEF DESCRIPTION OF THE DRAWINGS

FIG. 4A is a schematic perspective view showing the rear surface of a communication device in accordance with an illustrative embodiment;

FIG. 4B is a schematic perspective view showing the front surface of the communication device of FIG. 4A;

FIG. 4C is a schematic side view of the communication device of FIG. 4A;

FIG. 4D is a schematic cross-sectional view taken along line 4D-4D in FIG. 4C.

DETAILED DESCRIPTION OF THE ILLUSTRATIVE EMBODIMENTS

Figure 1:
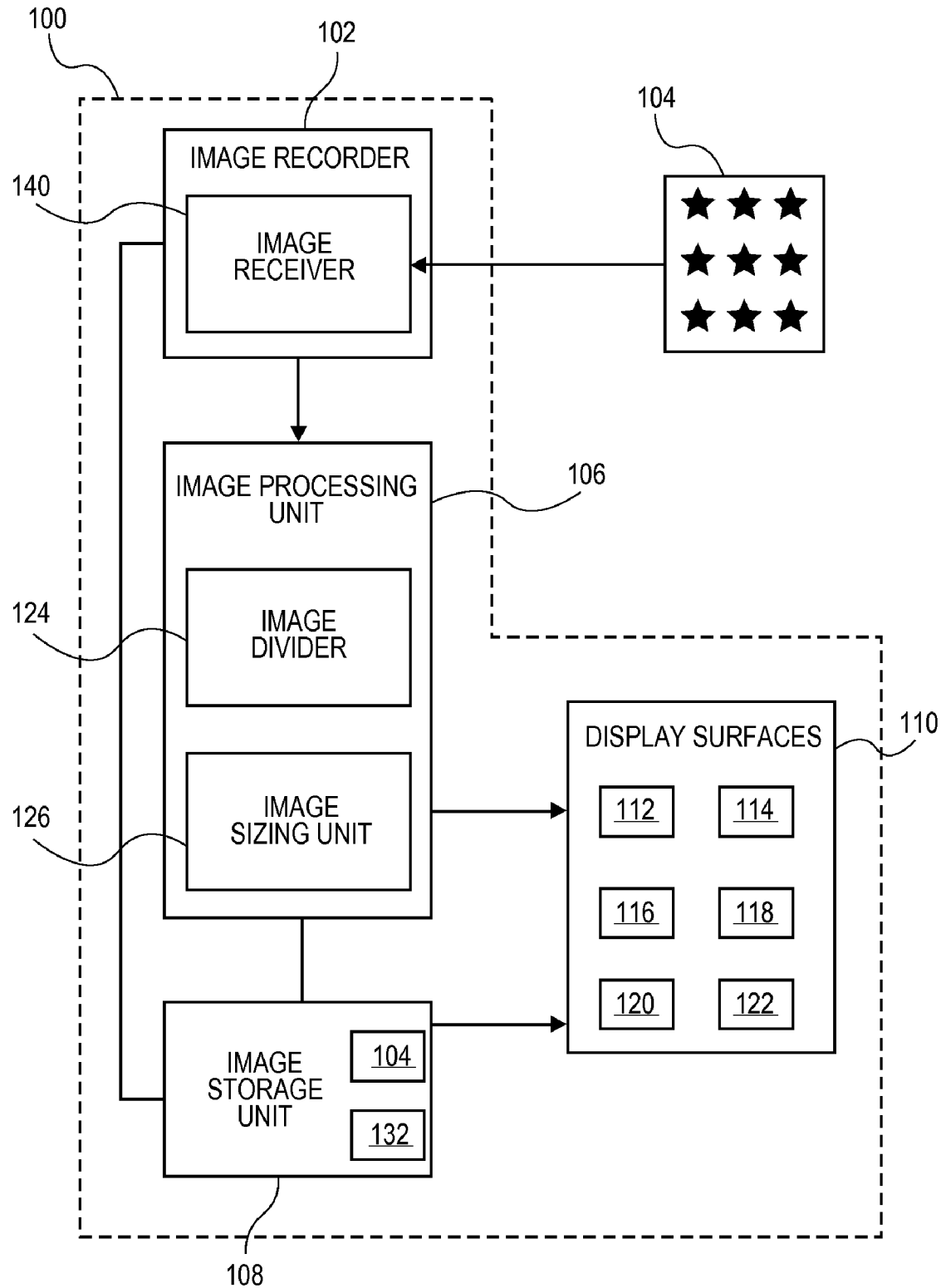
FIG. 1 is a schematic block diagram of a communication device for displaying an image in a plurality of directions in accordance with an illustrative embodiment.
Figure 2:
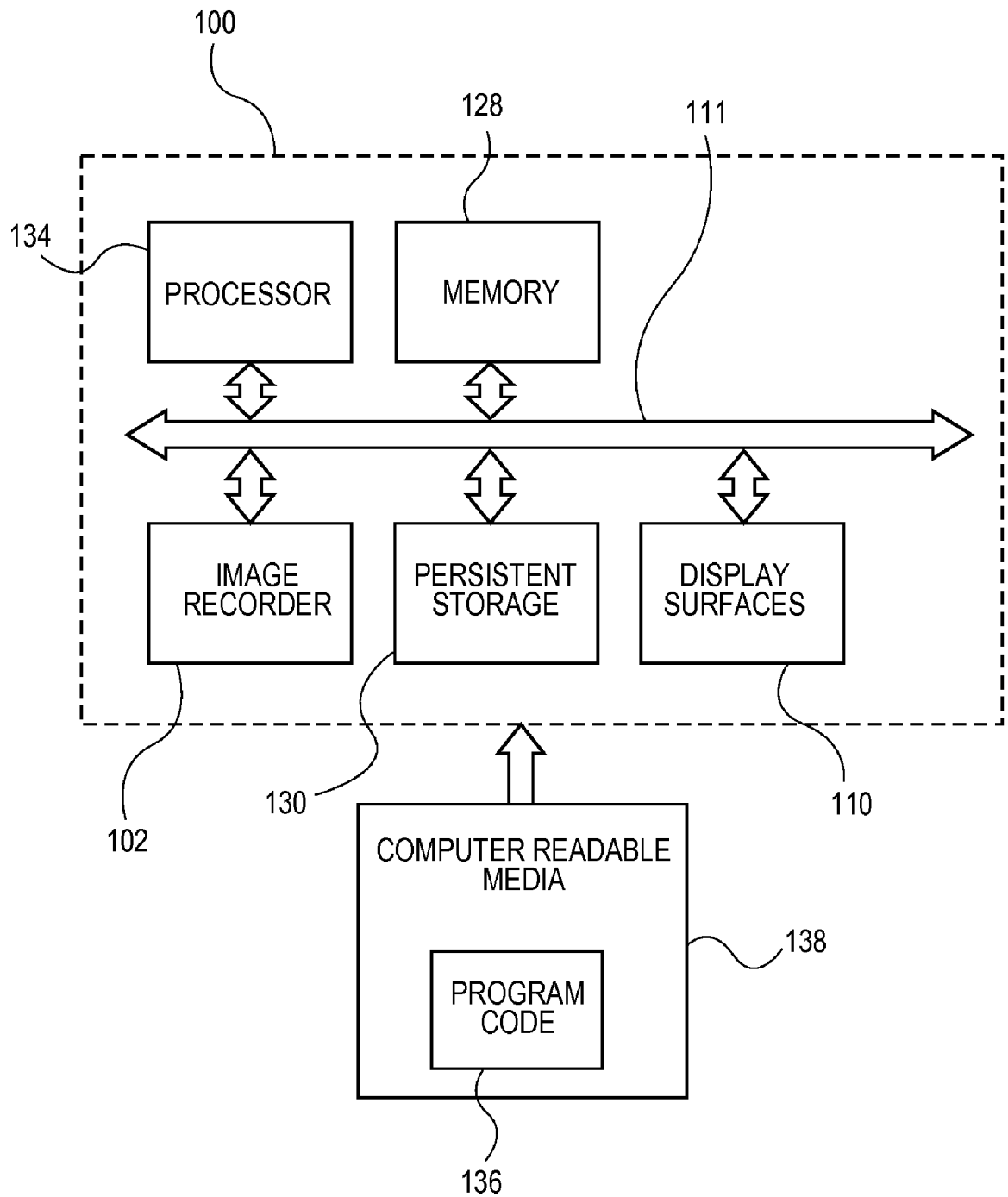
FIG. 2 is a schematic block diagram of hardware components of a communication device in accordance with an illustrative embodiment.

Referring to FIGS. 1 and 2, a communication device 100 for displaying an image 104 in a plurality of directions is shown in accordance with an illustrative embodiment. An image recorder 102 is operable to capture an image 104, which may be processed by an image processing unit 106 and stored on an image storage unit 108. The image 104 may then be displayed on display surfaces 110 that cover the communication device 100. As used herein, "cover" includes partially or fully covering. The various components of the communication device 100 may be implemented using the hardware components of the communication device 100 shown in FIG. 2. A communications fabric 111 may be used to provide communication between the various hardware components in FIG. 2.

The display surfaces 110 that cover the communication device 100 each face a different direction. Although the communication device 100 is shown to have six display surfaces, the communication device 100 may have any number of display surfaces. The number, shape, and directional orientation of the display surfaces 110 may depend on a variety of factors, including the shape of the communication device 100. For instance, in an example in which the shape of the communication device 100 approximates a rectangular prism, the display surfaces 110 may include a front surface 112, a rear surface 114, a top surface 116, a bottom surface 118, a first side surface 120, and a second side surface 122. The communication device 100 may have any shape, and non-limiting examples are provided below in FIGS. 4 and 5.

In one embodiment, the same image or portion thereof is used to cover all displayable surfaces of the device. In one embodiment, each of the display surfaces 110 is operable to display a different portion of the image 104. In this embodiment, an image divider 124 may divide the image 104 into two or more image portions, and each of these image portions may be displayed on a respective display surface of the communication device 100. In addition, an image sizing unit 126 may modify the size or dimensions of each image portion to fit one of the display surfaces 110. Unless otherwise indicated, as used herein, "or" does not require mutual exclusivity. When displayed on the display surfaces 110, different portions of the processed image that are formed by the image processing unit 106 may each be used to cover one or more exterior surfaces of the communication device 100. In one embodiment, different portions of the an image may each be used to cover different exterior surfaces of the communication device 100 that border or are adjacent to each other (referenced to herein as "wrapping" the communication device 100). In yet another embodiment, the wrapping of the communication device 100 is accomplished in a manner that makes the image appear continuous from one exterior surface to another. By way of analogy, in this embodiment the resulting displayed image may appear to cover the communication device 100 as if the image 104 itself were wrapped around the communication device 100.

Displaying the image 104 in the manner described in the illustrative embodiments may cause the communication device 100 to have a chameleon-like effect that allows the communication device 100 to approximate its surroundings. The potential applications for such a chameleon-like effect are numerous. In one example, a user may take a picture of any portion of their attire, such as their clothes or accessories, and command the communication device 100 to display the picture on the display surfaces 110, thus creating a desirable aesthetic effect. For instance, a female user may take a picture of a polka dot pattern on her dress, and display the polka dot pattern on the communication device 100 so that the polka dot pattern covers the communication device 100 to aesthetically match her dress. This matching quality may be repeated as desired as the user changes clothes, or the user may select another item, such as her purse, with which to match the communication device 100. In another non-limiting example, the communication device 100 may be hidden from plain view by approximating the appearance of its surroundings. In this example, the communication device 100 may adapt to changing surroundings by periodically or automatically taking a picture of its surroundings, and then displaying the picture on the display surfaces 100. Thus, when the communication device 100 is moved from one location to another, the communication device 100 may remain hidden from view. The communication device 100 may also have other functional or aesthetic qualities.

The display surfaces 110 may display the image 104 using a variety of media. For example, the display surfaces may use LCD, LED, plasma, or electronic ink technologies to display the image 104. In one embodiment, the communication device 100 may use little or no power once the image 104 is displayed on the display surfaces 110, thereby increasing the battery life of the communication device 100. For example, the display surfaces 110 may utilize an electrophoretic display, which is a display that forms visible images by rearranging charged micro or pigment particles using an applied electric field. The charged particles may be suspended within an intermediate layer, such as a liquid polymer layer, that is sandwiched between two electrode layers. Instead of emitting light, as in an LCD display, the position or orientation of particles within the display surfaces 110 may be changed to reflect light such that the image 104 is displayed. Examples of technologies that utilize these or similar concepts include electronic ink, e-paper, digital ink, electro-wetting displays, cholesteric LCDs, and organic transistors embedded in flexible substrates. These and other technologies may be used to form the display surfaces 110.

The image storage unit 108 may store the image directly from the image recorder 102, or may store the image 104 after the image 104 has been processed by the image processing unit 106. In another example, the image 104 may originate from a source other than the image recorder 102. For example, the image 104 may be downloaded to the communication device 100 and stored on the image storage unit 108.

The image storage unit 108 may include a memory 128 or a persistent storage 130. Memory 128, in these examples, may be, for example, a random access memory or any other suitable volatile or non-volatile storage device. Persistent storage 130 may take various forms depending on the particular implementation. For example, persistent storage 130 may contain one or more components or devices. For example, persistent storage 130 may be a hard drive, a flash memory, a rewritable optical disk, a rewritable magnetic tape, or some combination of the above. The media used by persistent storage 130 also may be removable. For example, a removable hard drive may be used for persistent storage 130.

In another embodiment, the image storage unit 108 may store more than one image 104, each of which are displayed on the display surfaces 110. For example, the image storage unit 108 may store a second image 132. A portion of the display surfaces 110 may be used to display the image 104, and a portion of the display surfaces 110 may be used to display the second image 132. Each of the images stored on the image storage unit 108 may have been processed by the image processing unit 106.

The image recorder 102 may include an image receiver 140, such as a lens, that receives the image 104. The image recorder 102 may also be operable to store the image 104 on the image storage unit 108 or send the image 104 to the image processing unit 106. In one embodiment, the image recorder 102 may be a camera. The camera may be integrated with the structure of the communication device 100, or may be a separate unit.

In another embodiment, the image recorder 102 may be a camcorder capable of recording video, which may be stored on the image storage unit 108 or sent to the image processing unit 106. In this embodiment, the display surfaces 110 may display the video captured by the image recorder 102 or received from another source in still form from a video or as a dynamic sequence of video frames of recorded speed or altered speed. The communication device 100 may also move the image 104 in a path around the display surfaces 100. For example, a user may take a picture or otherwise obtain an image of a fish and command the communication device 100 to show the fish moving, or "swimming", around the display surfaces 110. The image 104 may also jump from one location to another disjointed location on the display surfaces 110. In one example, the display of video on the communication devices 100 may serve as a screen saver that prolongs the life of the display surfaces 110. The images of the video may also be processed by the image processing unit 106.

The image processing unit 106 may utilize processor 134 to execute any instructions that modify the image 104 in any manner, including through the use of the image divider 124 and the image sizing unit 126. The processor 134 serves to execute instructions for software that may be loaded into the memory 128. The processor 134 may be a set of one or more processors or may be a multi-processor core, depending on the particular implementation. Further, the processor 134 may be implemented using one or more heterogeneous processor systems in which a main processor is present with secondary processors on a single chip. As another illustrative example, the processor 134 may be a symmetric multi-processor system containing multiple processors of the same type.

Instructions for any component of the communication device 100, including the image processing unit 106, may be located on the persistent storage 130. These instructions may be loaded into the memory 128 for execution by the processor 134. The processes of the different embodiments may be performed by the processor 134 using computer-implemented instructions, which may be located in a memory, such as the memory 128. These instructions are referred to as program code, computer-usable program code, or computer-readable program code that may be read and executed by the processor 134. The program code in the different embodiments may be embodied on different physical or tangible computer-readable media, such as the memory 128 or the persistent storage 130.

The program code 136 utilized by the communication device 100 may be located in a functional form on computer-readable media 138, and may be loaded onto or transferred to the communication device 100 for execution by the processor 134. For example, the program code 136 that contains instructions for the operation of the image processing unit 106 may be downloaded, or otherwise loaded, onto the communication device 100 from any network source. In this example, the program code 136 may be deployed to the communication device 100 via, inter alia, over the air programming, the Internet, or Bluetooth.

The different components illustrated for the communication device 100 are not meant to provide architectural limitations to the manner in which different embodiments may be implemented. The different illustrative embodiments may be implemented in a communication device including components in addition to or in place of those illustrated for the communication device 100.

In one embodiment, a bus system may be used to implement the communications fabric 111 and may be comprised of one or more buses, such as a system bus or an input/output bus. The bus system may be implemented using any suitable type of architecture that provides for a transfer of data between different components or devices attached to the bus system. Further, the memory 128 may be, for example, a cache such as found in an interface and memory controller hub that may be present in the communications fabric 111.

Referring to FIGS. 3 and 4A-D, an image 304 and several views of a communication device 300 are shown according to an illustrative embodiment. In particular, FIGS. 3 and 4A-D show how the image 304 may be displayed on the communication device 300 according to an illustrative embodiment. The communication device 300 includes a camera 302 that may be used to capture the image 304. Parts that are analogous to other figures have been shown by indexing the reference numerals by 100.

In FIGS. 4A-D, display surfaces 312, 314, 316, 318, 320, and 322 cover each surface of the communication device 300. Specifically, the display surfaces include a front surface 312, a rear surface 314, a top surface 316, a bottom surface 318, a first side surface 320, and a second side surface 322, each of which cover a respective surface of the communication device 300. Although the communication device 300 is shown to be a rectangular prism, the communication devices disclosed herein may have any shape suitable for a communication device.

Each of the display surfaces 312, 314, 316, 318, 320, and 322 face a different direction. Some of the display surfaces face opposite directions. For example, display surfaces 312, 316, and 320 face opposite directions as display surfaces 314, 318, and 322, respectively. Some of the display surfaces face orthogonal directions. For example, display surface 312 faces a direction 342 that is orthogonal to the directions 344, 346, 348, and 350 faced respectively by display surfaces 316, 318, 320, and 322. In other embodiments, the angle Θ formed between any two of the display surfaces may have any value in the range between 1° and 180°.

The communication device 300 may also include a transparent film 352. The transparent film 352 covers the display surfaces 312, 314, 316, 318, 320, and 322. The transparent film 352 includes portions, such as portions 354, 356, 358, and 360, which cover adjacent edges of the display surfaces 312, 314, 316, 318, 320, and 322. These portions 354, 356, 358, and 360 have a curved surface that creates the appearance of continuity between the images displayed on each of the display surfaces 312, 314, 316, 318, 320, and 322. The portions 354, 356, 358, and 360 may create this appearance by bending or meshing the light emitted or reflected by each of the covered display surfaces 312, 314, 316, 318, 320, and 322, especially at the edges of the display surfaces 312, 314, 316, 318, 320, and 322.

In one embodiment, the image 304 may be processed by an image processing unit, such as image processing unit 106 in FIG. 1, to form a processed image that is displayable on the display surfaces 312, 314, 316, 318, 320, and 322. For example, the image 304 may be divided into image portions 362, 364, 366, 368, 370, and 372 by an image divider, such as the image divider 124 in FIG. 1. In this example, each of these image portions 362, 364, 366, 368, 370, and 372 are displayed on display surfaces 316, 314, 318, 320, 312, and 322, respectively.

Figure 3:
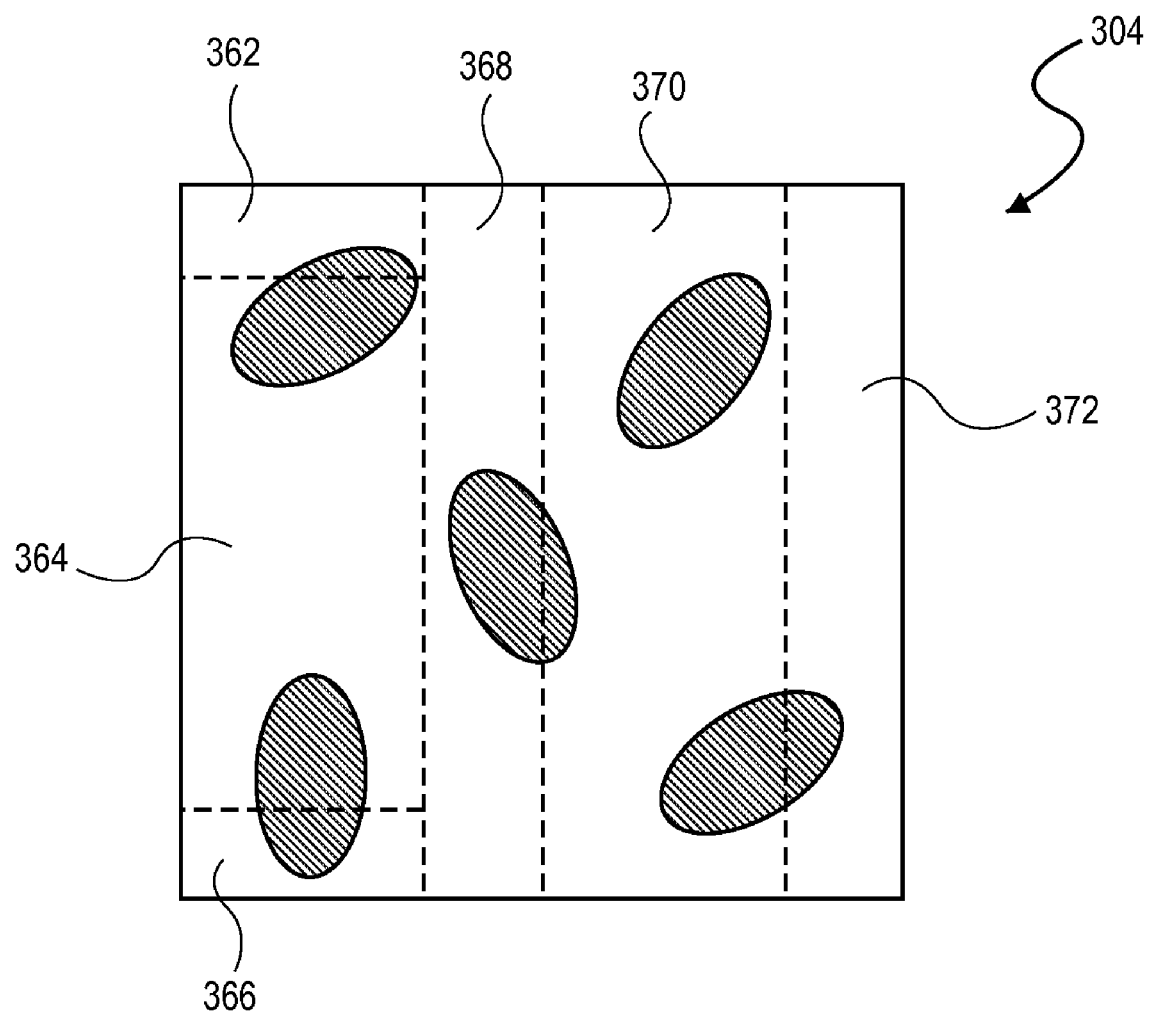
FIG. 3 is an example of an image that may be used in conjunction with the illustrative embodiments.

In FIG. 3, all of the image 304 has been divided such that the entire image is displayed on the communication device 300. However, less than all of the image 304 may be divided into image portions such that some portions of the image 304 are not displayed on the communication device 300.

The dimensions and size of the each of the image portions 362, 364, 366, 368, 370, and 372, may be modified by an image sizing unit, such as image sizing unit 126 in FIG. 1. For example, an image sizing unit may conform the dimensions and size of one of the image portions 362, 364, 366, 368, 370, and 372 to fit one of the display surfaces 316, 314, 318, 320, 312, and 322. Such a modification may be performed, for example, when the shape or size of an image portion is different from the shape or size of a display surface.

Any image editing tool may be used to modify the image 304 or the image portions 362, 364, 366, 368, 370, and 372. For example, the image 304, or portions thereof, may undergo pixel interpolation, cropping, scaling, color changing, rasterization, layering, noise removal, reorientation, flipping, rotating, distortion, skewing, sharpening, softening, merging, slicing, depth modification, brightening, darkening, contrast modification, or warping. Any image editing application may also be used to modify the image 304 or the image portions 362, 364, 366, 368, 370, and 372. In one example, the modification may serve to make the image 304 appear more continuous when displayed on the display surfaces 316, 314, 318, 320, 312, and 322. However, the modification may serve any functional or aesthetic purpose.

By way of illustration, the size of image portions 364 and 370 are different, yet are displayed on display surfaces 314 and 312 that are approximately the same size. An image sizing unit may increase or decrease the size of image portions 364 and 370 so that they fit on their respective display surfaces and may, for example, facilitate the appearance of a continuous image on the communication device 300.

Figure 5B:
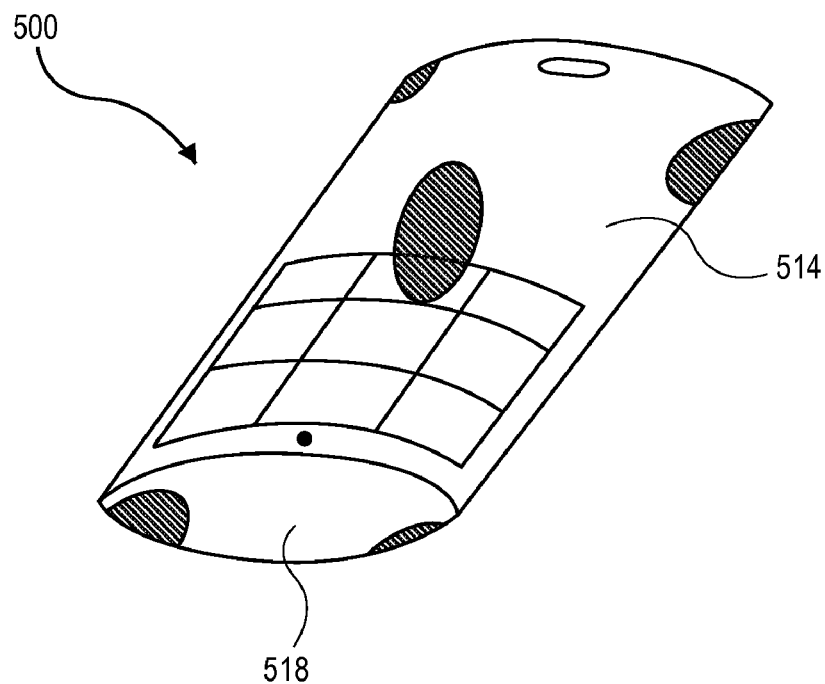
FIG. 5B is a schematic perspective view of a communication device in accordance with an illustrative embodiment.
Figure 5A:
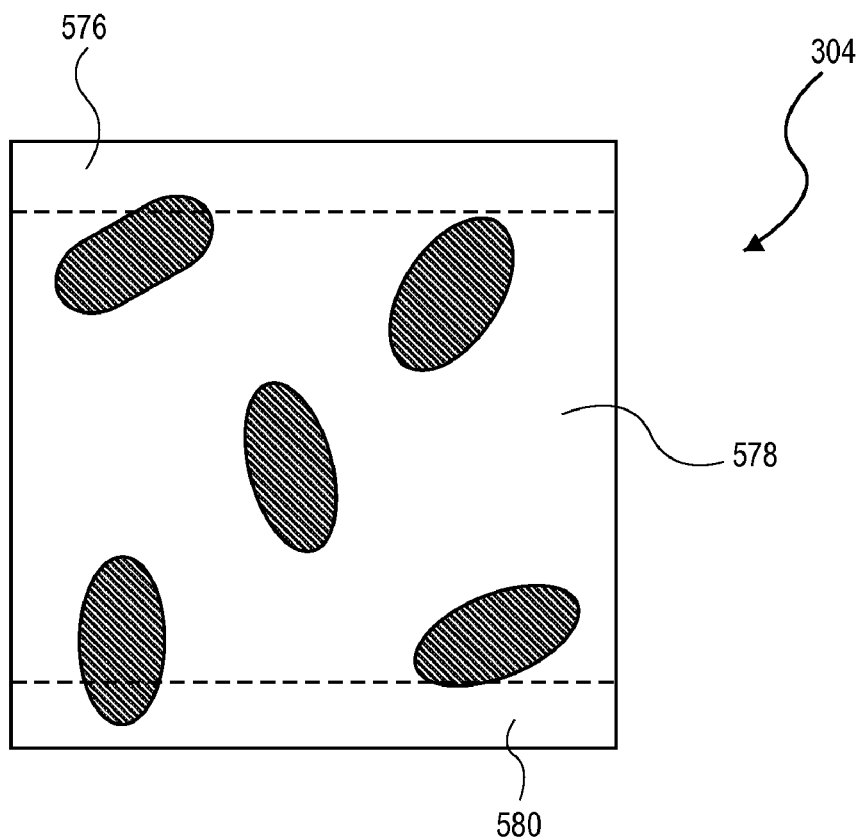
FIG. 5A is an example of an image that may be used in conjunction with the illustrative embodiments.

Referring to FIGS. 5A and 5B, the image 304 and a communication device 500 are shown according to an illustrative embodiment. In particular, FIGS. 5A and 5B show how the image 304 may be displayed on the communication device 500 according to an illustrative embodiment. In contrast to the communication device 300 in FIGS. 4A-D, the communication device 500 has a ellipsoidal cylinder shape, and includes a curved display surface 574, a top display surface (not shown), and a bottom display surface 518. The curved display surface 574 surrounds the communication device 500 and faces multiple directions.

The image 304 may be processed in manner similar to that described above with respect to FIGS. 3 and 4A-D, but adapted to fit the display surfaces covering the communication device 500. In particular, the image 304 may be divided into image portions 576, 578, and 580. Image portions 576, 578, and 580 may then be processed by an image processing unit to be displayable on the top display surface, the curved display surface 574, and the bottom display surface 518, respectively. Because the curved display surface 574 surrounds the communication device 500, the image portion 578 also appears to surround the communication device 500.

Figure 6:
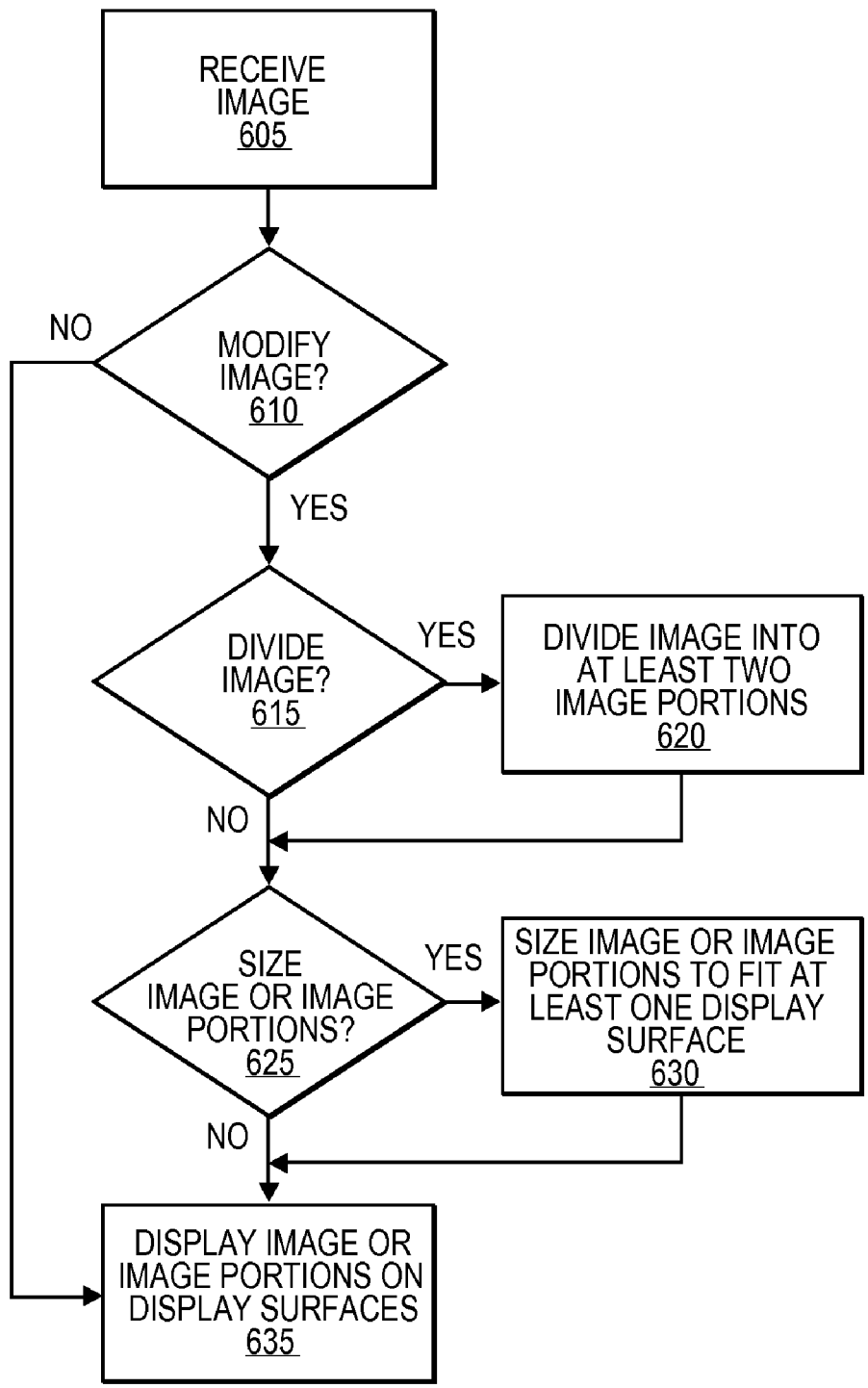
FIG. 6 is a schematic flowchart showing a process for displaying an image in a plurality of directions in accordance with an illustrative embodiment.

Referring to FIG. 6, a schematic flowchart showing a process for displaying an image in a plurality of directions is shown in accordance with an illustrative embodiment. The process illustrated by FIG. 6 may be implemented by an image processing unit, such as the image processing unit 106 in FIG. 1.

The process begins by receiving an image (step 605). The process then determines whether to modify the image to facilitate displaying the image on a plurality of display surfaces (step 610). If the process determines to modify the image to facilitate displaying the image on a plurality of display surfaces, the process determines whether to divide the image (step 615). If the process determines to divide the image, the process divides the image to form at least two image portions (step 620). The process proceeds to step 625.

Returning to step 615, if the process determines not to divide the image, the process determines whether to size the image or at least one of the image portions to fit at least one of the plurality of display surfaces (step 625). If the process determines to size the image or at least one of the image portions to fit at least one of the plurality of display surfaces, the process sizes the image or at least one of the image portions to fit at least one of the plurality of display surfaces (step 630). Step 630 may include increasing or decreasing the size of the image or at least one of the image portions, or modifying the dimensions of the image or at least one of the image portions. The process then proceeds to step 635.

If the process determines not to size the image or at least one of the image portions to fit at least one of the plurality of display surfaces, the process displays the image or image portions on the plurality of display surfaces (step 635). Returning to step 610, if the process determines not to modify the image to facilitate displaying the image on a plurality of display surfaces, the process displays the image on the plurality of display surfaces.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A communication device for displaying an image in a plurality of directions, the communication device comprising:
    a memory adapted to store an image; and
    an image recorder operable to receive the image and store the image on the memory;
    a plurality of display surfaces, each of the plurality of display surfaces facing a different direction, the plurality of display surfaces each operable to display a different portion of the image;
    a transparent film partially covering at least two of the display surfaces, wherein the transparent film creates a curved surface between the at least two of the display surfaces, the curved surface creating the appearance of continuity between images displayed on the at least two of the display surfaces by bending or meshing the light emitted by each of the at least two of the display surfaces; and
    a processor that executes instructions to automatically and periodically capture a surrounding image using the image recorder and display the surrounding image on the plurality of display surfaces.

2. The communication device of claim 1, wherein the plurality of display surfaces also includes a front surface, a rear surface, a first side surface, and a second side surface.

3. The communication device of claim 1, wherein at least two of the plurality of display surfaces face opposite directions.

4. The communication device of claim 1, wherein at least two of the plurality of display surfaces face orthogonal directions.

5. The communication device of claim 1, wherein the image recorder includes a camera.

6. The communication device of claim 1, wherein the image comprises a first image and a second image, wherein a first portion of the plurality of display surfaces displays at least a portion of the first image, and wherein a second portion of the plurality of display surfaces displays at least a portion of the second image.

7. A communication device for displaying an image in a plurality of directions, the communication device comprising:
    an image recorder operable to receive an image and store the image on a memory;
    a plurality of display surfaces operable to display the image and at least partially covering each surface of the communication device, each of the plurality of display surfaces facing a different direction; and
    a processor configured to execute instructions to automatically and periodically capture a surrounding image using the image recorder, display the surrounding image on the plurality of display surfaces and to move at least a portion of the surrounding image about the plurality of display surfaces in a path around the plurality of display surfaces.

8. The communication device of claim 7, wherein the plurality of display surfaces includes a front surface, a rear surface, a top surface, a bottom surface, a first side surface, and a second side surface.

9. The communication device of claim 7, wherein the plurality of display surfaces includes a curved surface surrounding the communication device, a top surface, and a bottom surface.

10. The communication device of claim 7, wherein the image recorder includes a camera.

11. A method for displaying an image on a communication device in a plurality of directions, the method comprising:
    receiving an image using an image recorder of the communication device;
    modifying the image to facilitate displaying the image on a plurality of display surfaces on the communication device to form a processed image, each of the plurality of display surfaces facing a different direction, the plurality of display surfaces each operable to display a different portion of the image;
    displaying the processed image on the plurality of display surfaces on the communication device, wherein the displayed image depicts a surrounding image of the communication device;
    automatically capturing a new image periodically using the image recorder of the communication device; and
    repeating the modifying and displaying step using the new image.

12. The method of claim 11, wherein modifying the image includes dividing the image to form at least two image portions, further comprising:
    displaying each image portion on at least one of the plurality of display surfaces.

13. The method of claim 12, wherein modifying the image includes sizing at least one of the image portions to fit at least one of the plurality of display surfaces.

14. The method of claim 13, wherein sizing the at least one of the image portions includes one of increasing or decreasing the size of the at least one of the image portions.

15. The method of claim 11, wherein modifying the image includes sizing the image to fit at least one of the plurality of display surfaces.

16. The method of claim 11, wherein the image includes a first image and a second image, and wherein displaying the processed image on the plurality of display surfaces includes:
   displaying the first image on a first portion of the plurality of display surfaces; and
   displaying the second image on a second portion of the plurality of display surfaces.

* * * * *